(12) United States Patent
Webster et al.

(10) Patent No.: US 8,031,991 B2
(45) Date of Patent: Oct. 4, 2011

(54) LOW INDEX, LARGE MODE FIELD DIAMETER OPTICAL COUPLER

(75) Inventors: Mark Webster, Bethlehem, PA (US); Vipulkumar Patel, Breinigsville, PA (US)

(73) Assignee: Lightwire Inc., Allentown, PA (US)

( * ) Notice: Subject to any disclaimer, the term of this patent is extended or adjusted under 35 U.S.C. 154(b) by 0 days.

(21) Appl. No.: 12/454,963

(22) Filed: May 27, 2009

(65) Prior Publication Data
US 2009/0297093 A1    Dec. 3, 2009

Related U.S. Application Data

(60) Provisional application No. 61/130,092, filed on May 28, 2008, provisional application No. 61/131,106, filed on Jun. 5, 2008, provisional application No. 61/133,683, filed on Jul. 1, 2008.

(51) Int. Cl.
*G02B 6/26* (2006.01)
*G02B 6/42* (2006.01)

(52) U.S. Cl. .......................................... 385/28; 385/43

(58) Field of Classification Search ................... 385/28, 385/30, 43, 49, 50
See application file for complete search history.

(56) References Cited

U.S. PATENT DOCUMENTS

| | | | |
|---|---|---|---|
| 4,715,672 A | 12/1987 | Duguay et al. | |
| 5,276,748 A | 1/1994 | Magel | |
| 5,367,582 A | 11/1994 | Magel | |
| 5,502,779 A | 3/1996 | Magel | |
| 5,692,076 A | 11/1997 | Delisle et al. | |
| 6,870,987 B2 | 3/2005 | Lee | |
| 7,013,067 B2 | 3/2006 | Ghiron et al. | |
| 7,076,135 B2 | 7/2006 | Yamada et al. | |
| 7,103,245 B2 * | 9/2006 | Lee et al. | 385/28 |
| 7,359,593 B2 * | 4/2008 | Little | 385/30 |
| 7,391,948 B2 * | 6/2008 | Kempen et al. | 385/132 |
| 7,469,084 B2 | 12/2008 | Aalto | |
| 2004/0037497 A1 * | 2/2004 | Lee | 385/28 |
| 2009/0245728 A1 * | 10/2009 | Cherchi et al. | 385/28 |

OTHER PUBLICATIONS

Tsuchizawa, T. et al. "Microphotonics devices based on silicon microfabrication technology", IEEE Journal of selected topic in Quantum Electronics, Jan./Feb. 2005,vol. 11, No. 1, pp. 232-240. Abstract; Figure 2; pp. 233-234.

(Continued)

*Primary Examiner* — Hemang Sanghavi
(74) *Attorney, Agent, or Firm* — Wendy W. Koba

(57) ABSTRACT

An optical coupler is formed of a low index material and exhibits a mode field diameter suitable to provide efficient coupling between a free space optical signal (of large mode field diameter) and a single mode high index waveguide formed on an optical substrate. One embodiment comprises an antiresonant reflecting optical waveguide (ARROW) structure in conjunction with an embedded (high index) nano-taper coupling waveguide. Another embodiment utilizes a low index waveguide structure disposed in an overlapped arrangement with a high index nanotaper coupling waveguide. The low index waveguide itself includes a tapered region that overlies the nanotaper coupling waveguide to facilitate the transfer of the optical energy from the low index waveguide into an associated single mode high index waveguide. Methods of forming these devices using CMOS processes are also disclosed.

15 Claims, 15 Drawing Sheets

OTHER PUBLICATIONS

Galarza, M. et al. "A new spot-size convertor concept using fiber-matched antiresonant reflecting optical waveguides", Journal of Lightwave Technology, Jan. 2003,vol. 21, No. 1, pp. 269-274. Abstract; Figures 5-6, pp. 270-271.

Almeida, V.R. et al., "Nanotaper for compact mode conversion", Optics Letters, Aug. 1, 2003, vol. 28, No. 15, pp. 1302-1304. Abstract; Figure 1; p. 1302.

Liu, Bin et al., "Characteristic Equations for different Arrow Structures", Optical and Quantum Electronics 31: 1267-1276, 1999.

Stankovic, S. et al., Silicon Photonic Waveguides for Near-and Mid-Infrared Regions, ISCOM07, Belgrade Serbia, Sep. 3-7, 2007, vol. 112 , No. 5.

Bernini, R. et al., "Integrated Optical Refractometer Based on Rib-ARROW Waveguide", CNR-IREA Napoli Italy; Sec. Univ. of Naples, Aversa, Italy; DIMES-ECTM, The Netherlands, 2003.

Yin, D. et al., "Integrated ARROW Waveguides with Hollow Cores", Jun. 14, 2004/vol. 12, No. 12/Optics Express, pp. 2710-2715.

Galarza, M. et al. "Design of InGaAsP-InP Tapered Ridge Mode Transformer Using an Underlying ARROW Coupling Waveguide", Proceedings Symposium IEEE/LEOS 2000, The Netherlands.

Orobtchouk, R., "New ARROW Optical Coupler for Optical Interconnect", 2003 IEEE.

* cited by examiner

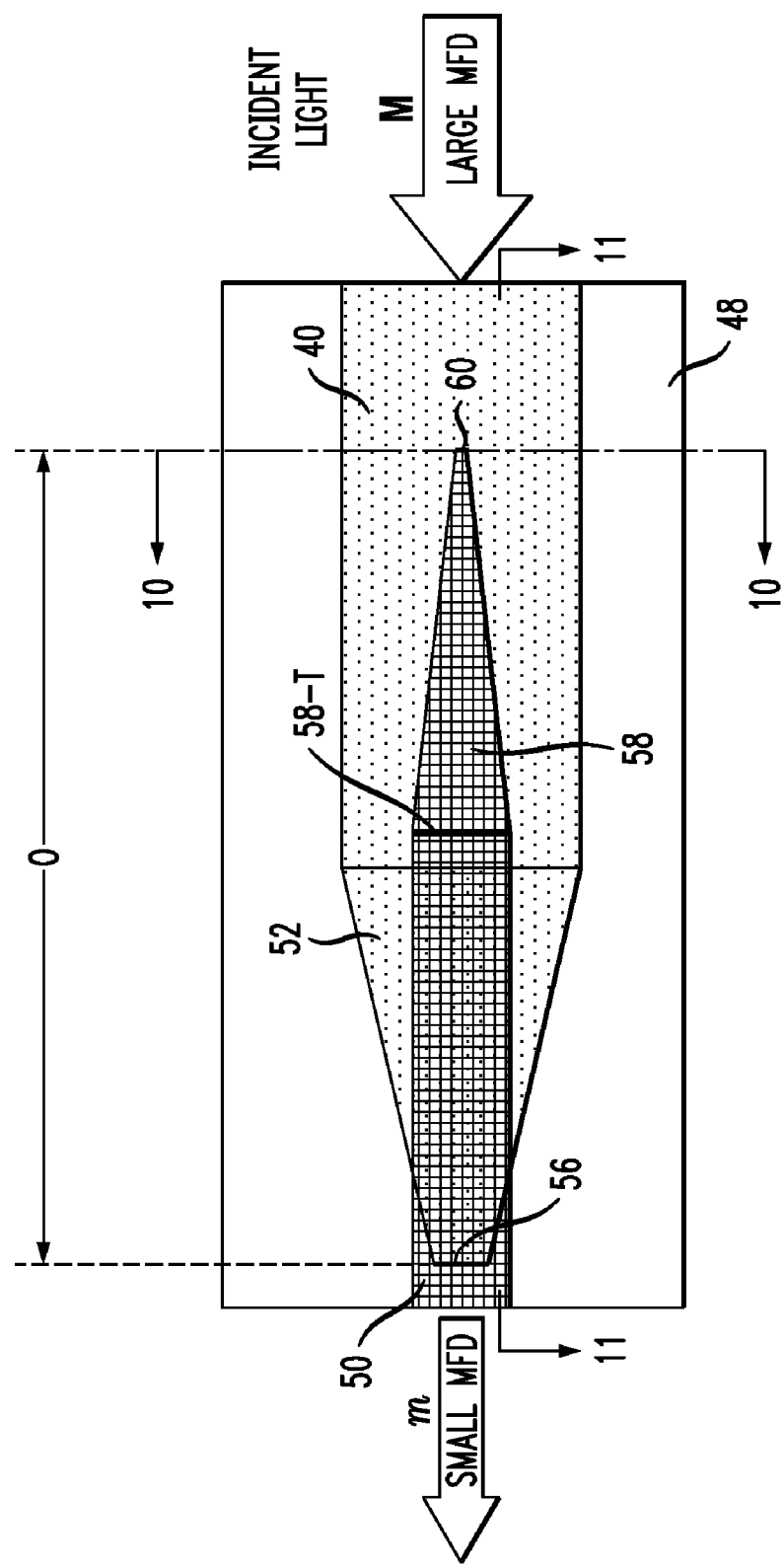

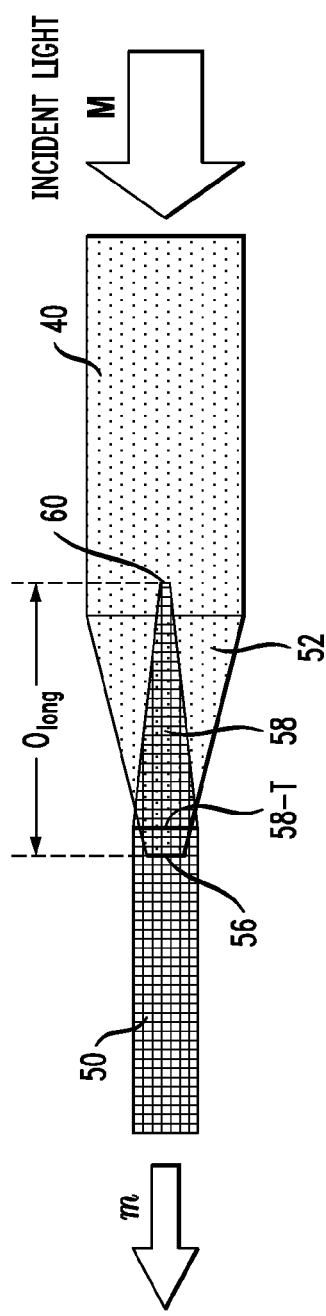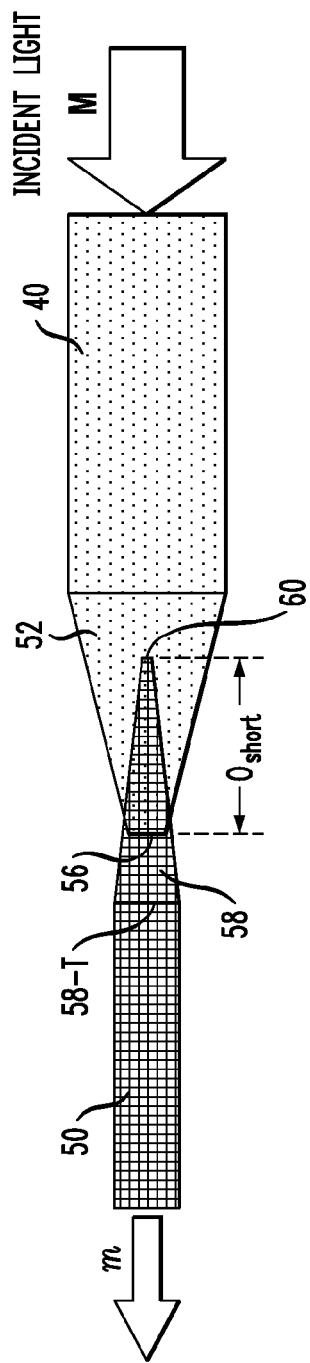

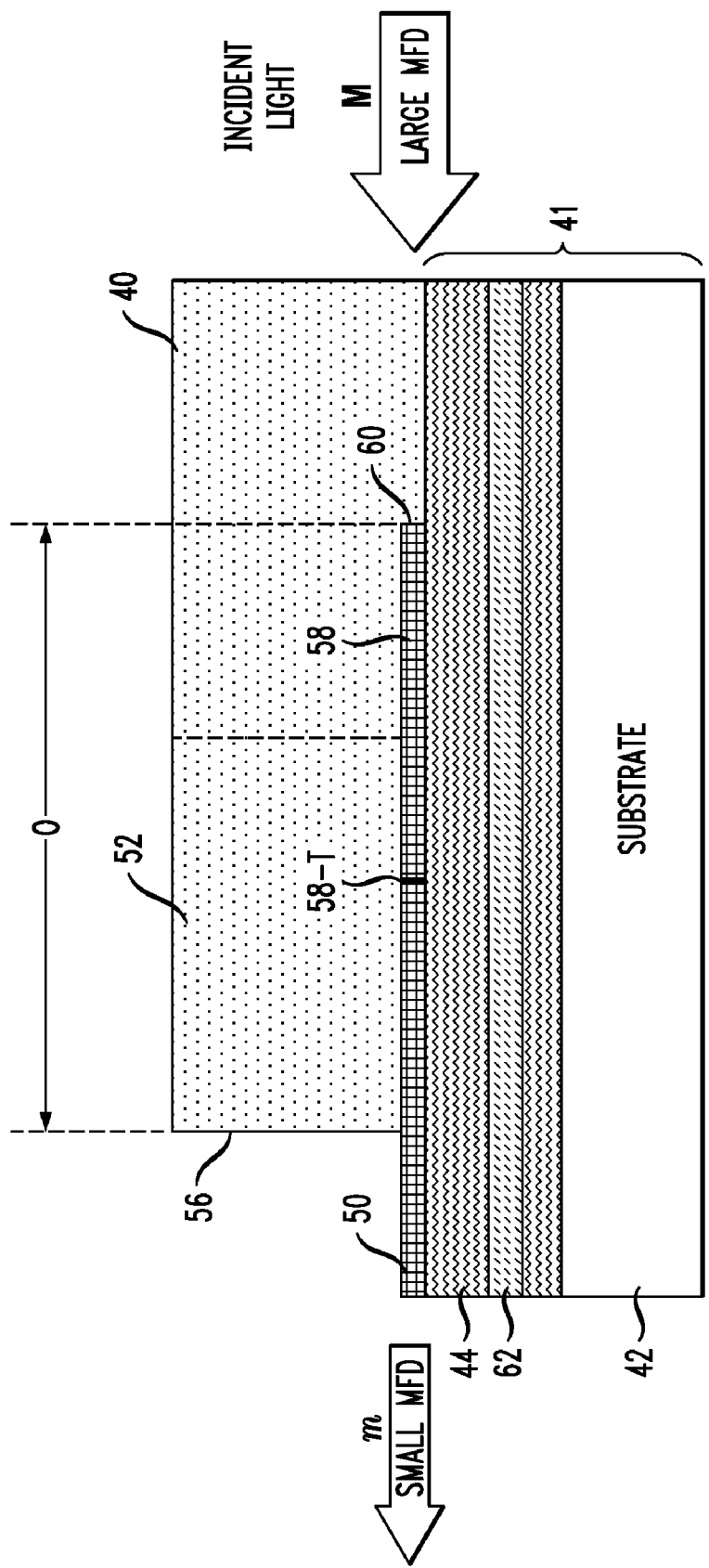

LOW INDEX, LARGE MODE FIELD DIAMETER OPTICAL COUPLER

CROSS-REFERENCE TO RELATED APPLICATIONS

This application claims the benefit of the following provisional applications: U.S. Provisional Application 61/130,092, filed May 28, 2008; U.S. Provisional Application 61/131,106, filed Jun. 5, 2008; and U.S. Provisional Application 61/133,683, filed Jul. 1, 2008, all of which are herein incorporated by reference.

TECHNICAL FIELD

The present invention relates to an optical coupler and, more particularly, to an optical coupler formed of a low index material and exhibiting a mode field diameter suitable to provide efficient coupling between a free space optical signal (of large mode field diameter) and a waveguide of high index material formed on an optical substrate, the inventive coupler capable of operating over a relatively wide bandwidth.

BACKGROUND OF THE INVENTION

Advances in the art of coupling between an external optical signal and an optical waveguide have recently been associated with the use of an optical "nanotaper" structure. A "nanotaper", which is sometimes referred to as an "inverse taper", is generally defined as a terminating portion of a core of a high index waveguide that is used to facilitate efficient coupling between a single mode optical fiber (for example) and a high index waveguide formed along an optical substrate. In a typical device construction, the lateral dimension of the portion of the nanotaper proximate to the core of the high index waveguide approximately matches the width of the core. The lateral dimension of the nanotaper decreases monotonically along the direction of light propagation until it reaches a small value associated with a "tip" (i.e., that portion of the nanotaper distal from the core of the high index waveguide). The tip portion represents the point at which light first enters or exits the nanotaper.

In some prior art nanotapers, the device is cleaved such that the endface of the tip essentially coincides with a cleaved edge of the optical substrate. Light is then launched directly into the tip of an entry nanotaper (or extracted directly from the tip of an exit nanotaper) by aligning the light source/receiver with the cleaved edge of the substrate. However, the presence of the high index nanotaper tip at the junction where the incoming signal couples into the optical substrate has been found to generate back-reflections, presenting problems when attempting to directly couple light from a laser facet into the waveguide. In fact, the back-reflections may cause the laser to become unstable.

Alternatively, in other prior art nanotapers, the position of the tip is recessed from the cleaved edge of the optical substrate. An auxiliary waveguide is then used to transmit light from the cleaved edge to the tip of the nanotaper. The auxiliary waveguide generally comprises larger dimensions and a lower refractive index than the single mode optical waveguide to improve coupling efficiency. The core of the auxiliary waveguide may comprise a polymer-based material with a refractive index on the order of 1.5-1.6.

One particular prior art nanotaper coupler arrangement using an auxiliary waveguide is shown in FIGS. 1 and 2. The auxiliary waveguide takes the form of a first, larger-dimensioned waveguide section that is generally disposed in an overlap arrangement with respect to a second, smaller-dimensioned waveguide section (which comprises the nanotaper), forming a "mode conversion region". Referring now to FIG. 1, reference numeral 1 denotes a single mode waveguide, reference numeral 2 denotes a mode field size conversion region, reference numeral 3 denotes an auxiliary waveguide section, reference numeral 4 denotes a nanotaper, and reference numeral 7 denotes a low index auxiliary waveguide. FIG. 2 best illustrates the geometry of nanotaper 4 along the surface of the optical substrate. Within mode field size conversion region 2, nanotaper 4 has a width that starts at a relatively small value at tip 5 (often 50-150 nm), and then tapers outward to the final desired waveguide dimensions associated with single mode optical waveguide 1. The thickness x of nanotaper 4 remains relatively constant along mode field size conversion region 2, where thickness x is best shown in FIG. 1.

The mode size associated with tip 5 of the nanotaper 4 is "large" (due to the weak confinement of the light) and shrinks as nanotaper 4 expands in size, providing tighter confinement of the light as the effective refractive index increases along the length of the nanotaper. This effect facilitates the required mode conversion into the smaller mode associated with ultrathin single mode waveguide 1.

In use, light is launched into an endface 6 of auxiliary waveguide section 3, where it propagates along unimpeded until it encounters tip 5 of nanotaper 4 in mode conversion region 2. At this point, the light beam is transferred from the relatively low effective index layer 7 of auxiliary waveguide section 3 to the relatively high effective index ultrathin waveguide 1 with low loss, since the mode size is gradually reduced along the extent of the taper.

Even when using such an auxiliary waveguide, coupling loss occurs as a result of mis-alignment between the incoming optical signal and the auxiliary waveguide. The configuration of the auxiliary waveguide also contributes to signal loss, associated with the incomplete mode conversion between the auxiliary waveguide and the nanotaper.

SUMMARY OF THE INVENTION

These and other problems of the prior art are addressed by the present invention, which relates to an optical coupling arrangement and, more particularly, to an optical coupler formed of a low index material and exhibiting a mode field diameter suitable to provide efficient coupling between a free space optical signal (of large mode field diameter) and a single mode high index waveguide formed on an optical substrate.

A first embodiment of the present invention comprises an antiresonant reflecting optical waveguide (ARROW) structure which is used in conjunction with an embedded nanotaper coupling waveguide to form a low loss optical coupling arrangement between a free space optical signal and a single mode high index optical waveguide. In a preferred arrangement, a conventional interlevel dielectric (ILD) layer used for creating metallic contact interconnections is also used as the low index ARROW structure, with an underlying high index material layer (e.g., silicon or silicon nitride) functioning as the antiresonant reflective surface of the ARROW structure.

In accordance with this embodiment of the present invention, an ARROW structure forms a large resonant cavity which is able to trap essentially all of the energy of an incident optical signal. The nanotaper coupling waveguide is disposed within the thickness of the ARROW structure (i.e., embedded within the low index core region) and is used to adiabatically transform the mode propagating along the ARROW structure into a strip waveguide mode, thus providing efficient coupling into a single mode high index waveguide disposed at the termination of the nanotaper coupling waveguide. It is to be understood that the coupler of this embodiment (like the others to be discussed below) is reciprocal in nature, allowing an optical signal propagating along a single mode waveguide to increase in mode field diameter and thereafter resonate in the Fabry-Perot cavity created by the ARROW structure and exit as a large mode field diameter signal, suitable for reception by a photodetecting device, coupling into an optical fiber, etc.

Another embodiment of the present invention utilizes a low index waveguide structure which is disposed in an overlapped arrangement with a nanotaper coupling waveguide. The low index waveguide itself includes a tapered region that overlies the nanotaper coupling waveguide to facilitate the transfer of the optical energy from the low index waveguide into an associated single mode high index waveguide.

The low index waveguide may comprise a strip (or a buried strip) geometry, rib geometry (including an inverted rib geometry), or other appropriate configuration (e.g., square, channel, rectangular, pyramidal, etc.). The composition of the waveguide may also be modified so as to change its refractive index as a function of length and accelerate mode conversion. Combinations of physical modifications and material modifications may also be used. Again, the reciprocal properties of this structure allow for the low index waveguide to serve as either an entrance coupler for an optical signal to be introduced to an integrated waveguide arrangement, or an exit coupler for an optical signal to be launched into free space.

Yet another embodiment of the present invention comprises a combination of the ARROW structure with the low index waveguide, formed by incorporating a layer of reflective (high index) material in the supporting substrate structure of the low index waveguide arrangement.

An exemplary method of forming a low index optical waveguide coupling arrangement in accordance with the present invention utilizes a specific fabrication process that forms an "inverted rib" area above an optical substrate. The method can be utilized to form either the ARROW structure or the low index structure as described above.

It is an advantage of the arrangement of the present invention that the use of the larger-featured low index waveguide structure relaxes some of the stringent sub-micron alignment tolerances of the prior art, while maintaining efficient conversion between a first element supporting a large mode field optical signal and a second element supporting a small mode field optical signal. The relaxation of the alignment tolerances also allows for a wider bandwidth of optical signals to be utilized.

Moreover, a plurality of low index, large mode field diameter coupling structures of the present invention may be fabricated and used on a wafer-scale basis, since CMOS processing and lithography techniques are used to form the coupler. In contrast, prior art arrangements generally require the use of discrete components (such as lenses) as part of the coupling system, which are not readily compatible with wafer-scale operations.

Other and further advantages and aspects of the present invention will become apparent during the course of the following discussion and by reference to the accompanying drawings.

BRIEF DESCRIPTION OF THE DRAWINGS

Referring now to the drawings, where like numerals represent like components in several views:

FIG. 9 is a top view of an alternative embodiment of the present invention, using a tapered low index waveguide in combination with a nanotaper (higher index) coupling waveguide;

FIG. 12 is a specific configuration of the embodiment of FIG. 9, illustrating a relatively long overlap region (denoted $O_{long}$) between the low index waveguide and the high index nanotaper coupling waveguide;

FIG. 13 is another specific configuration of the embodiment of FIG. 9, illustrating a relatively short overlap region (denoted $O_{short}$) between the low index waveguide and the high index nanotaper coupling waveguide

FIG. 16 is a side view of the embodiment of FIG. 15;

DETAILED DESCRIPTION

Free space optical signals, as well as signals from a light source or fiber, generally exhibit a large mode field diameter (when compared with, for example, the mode field supported by a single mode waveguide formed on a silicon-based optical substrate), requiring some type of mode conversion to provide efficient coupling into an optical waveguide with as little signal loss as possible. The utilization of a low index waveguide coupler, configured as described hereinbelow, is considered to provide improved coupling when compared to, for example, a prior art nanotaper coupler.

Figure 1:
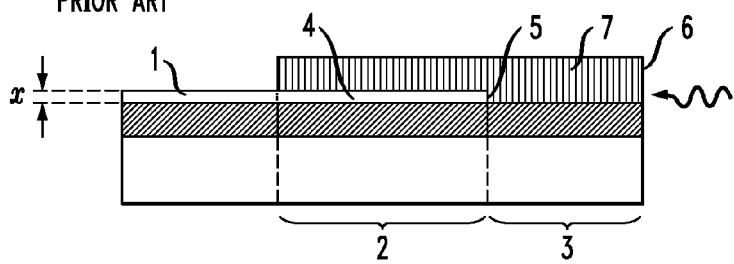
FIG. 1 is a side view of a prior art nanotaper coupler using an auxiliary coupling waveguide.
Figure 2:
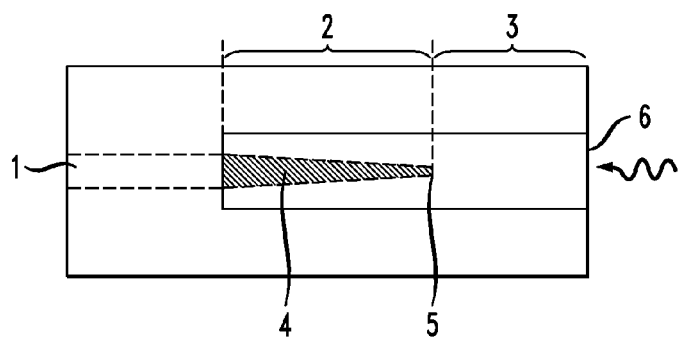
FIG. 2 is a top view of the prior art arrangement of FIG. 1.
Figure 3:
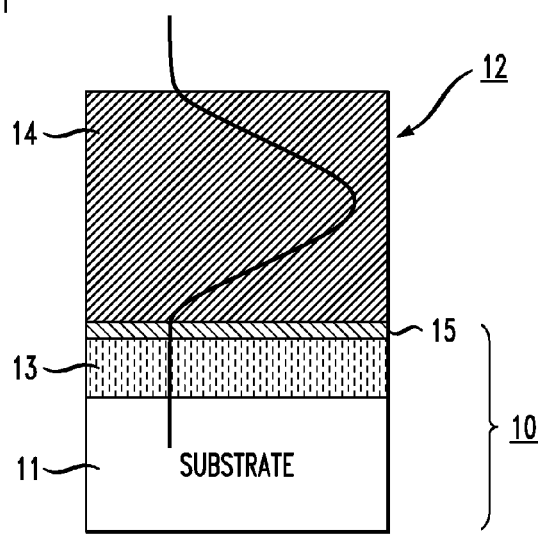
FIG. 3 is a side view of an exemplary prior art antiresonant reflecting optical waveguide (ARROW) formed on a silicon-based optical substrate.

One type of low index waveguide that is suitable for use in the inventive coupler described below is an antiresonant reflecting optical waveguide (ARROW). Advantageously, an ARROW structure can be formed of the same materials that are used to form conventional silicon-based opto-electronic devices. FIG. 3 is a side view of an exemplary prior art arrangement of a silicon optical structure 10 and an ARROW structure 12. Silicon optical structure 10 is shown as comprising a silicon substrate 11, a buried oxide (BOX) layer 13 and a surface layer 15 formed of a material with a relatively high refractive index (e.g., silicon, amorphous silicon, polysilicon, silicon nitride, etc.)—with respect to the surrounding oxide material.

ARROW structure 12 comprises a layer 14 of a low index material such as, for example, silicon dioxide which is formed over surface layer 15 of silicon optical structure 10. Layer 14 is formed to comprise a thickness of several microns, where a value of 4.0 µm has been found sufficient for a prior art ARROW structure formed of silicon dioxide. To form the desired ARROW geometry, layer 14 is processed using CMOS fabrication techniques to create sidewalls, dopant profiles, and the like, in one embodiment forming a rib structure as described below (although other geometries, as described above, can be used). Surface layer 15 of silicon optical structure 10 is used as the lower "reflecting" surface of ARROW structure 12, by virtue of its relatively high refractive index when compared to that of layer 14. Although not described in the following, it is to be understood that an ARROW structure requires an upper reflective boundary such that an antiresonant reflective cavity is formed. In some cases, the surrounding "air" itself is sufficient to form this upper reflecting surface.

In accordance with the known properties of ARROW structures, layer 14 supports the propagation of an optical signal, as shown, by functioning as a Fabry-Perot resonator at antiresonant wavelengths.

Figure 4:
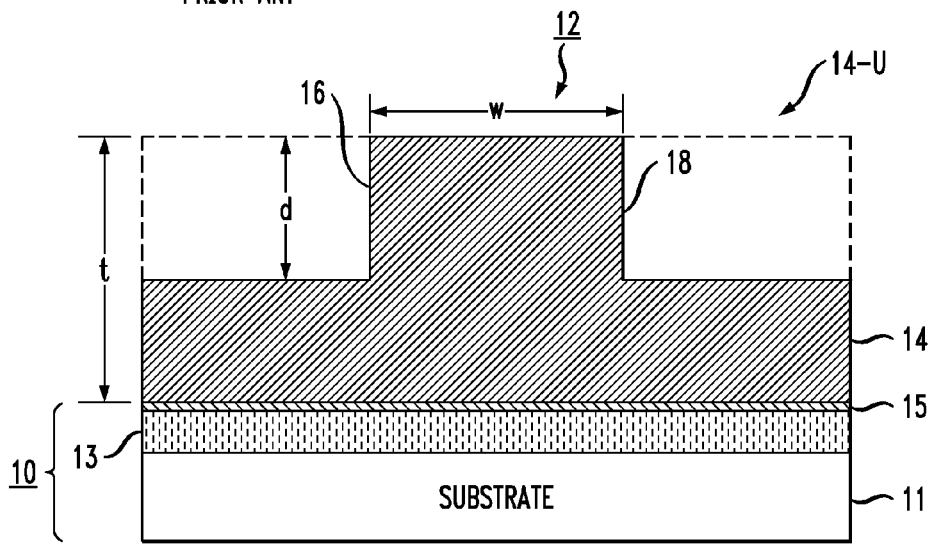
FIG. 4 is an end view of the prior art arrangement of FIG. 3.

FIG. 4 is an end view of the arrangement of FIG. 3, illustrating the formation of ARROW structure 12 as a rib structure within an upper portion 14-U of layer 14. Sidewalls 16 and 18 of ARROW structure 12 may be formed, for example, by removing a predetermined thickness of layer 14 using a CMOS processing technique. The resulting interfaces between sidewalls 16, 18 and air (or other low index material) form lateral sidewall boundaries for ARROW structure 12. Thus, in combination with surface layer 15 of silicon optical structure 10, a resonant structure is formed which supports the propagation of an optical signal.

Figure 5:
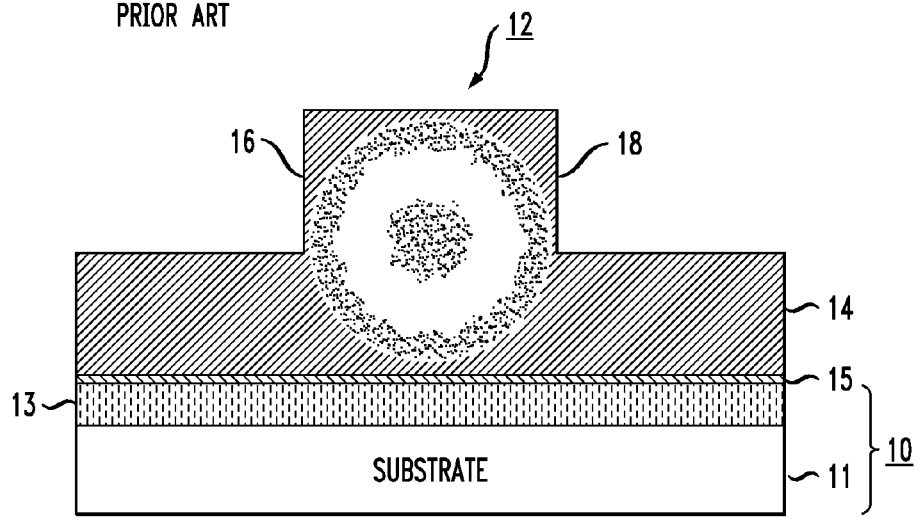
FIG. 5 contains a modal intensity profile supported by the prior art ARROW structure of FIG. 4.

In one exemplary embodiment, ARROW structure 12 was formed to exhibit a width w on the order of 6 µm, with a depth d of 3 µm (using an oxide layer 14 having a total thickness t of about 6 µm). An optical signal at an operating wavelength of, for example, 1310 nm can be supported by this particular ARROW structure 12 and experiences a loss of only about 0.57 dB/cm. Other wavelengths used in optical systems may also be supported, such as, but not limited to, 850, 980 or 1550 nm, where each wavelength will result in creating a different effective index and will exhibit a different loss. FIG. 5 illustrates the same arrangement as FIG. 4, including a modal intensity profile of an exemplary optical signal which may be supported by ARROW structure 12. It is to be understood that the modal widths can be varied by adjusting one or more of the parameters described above—the width w and depth d of rib 12, as well as the overall thickness t and refractive index of layer 14.

Figure 6:
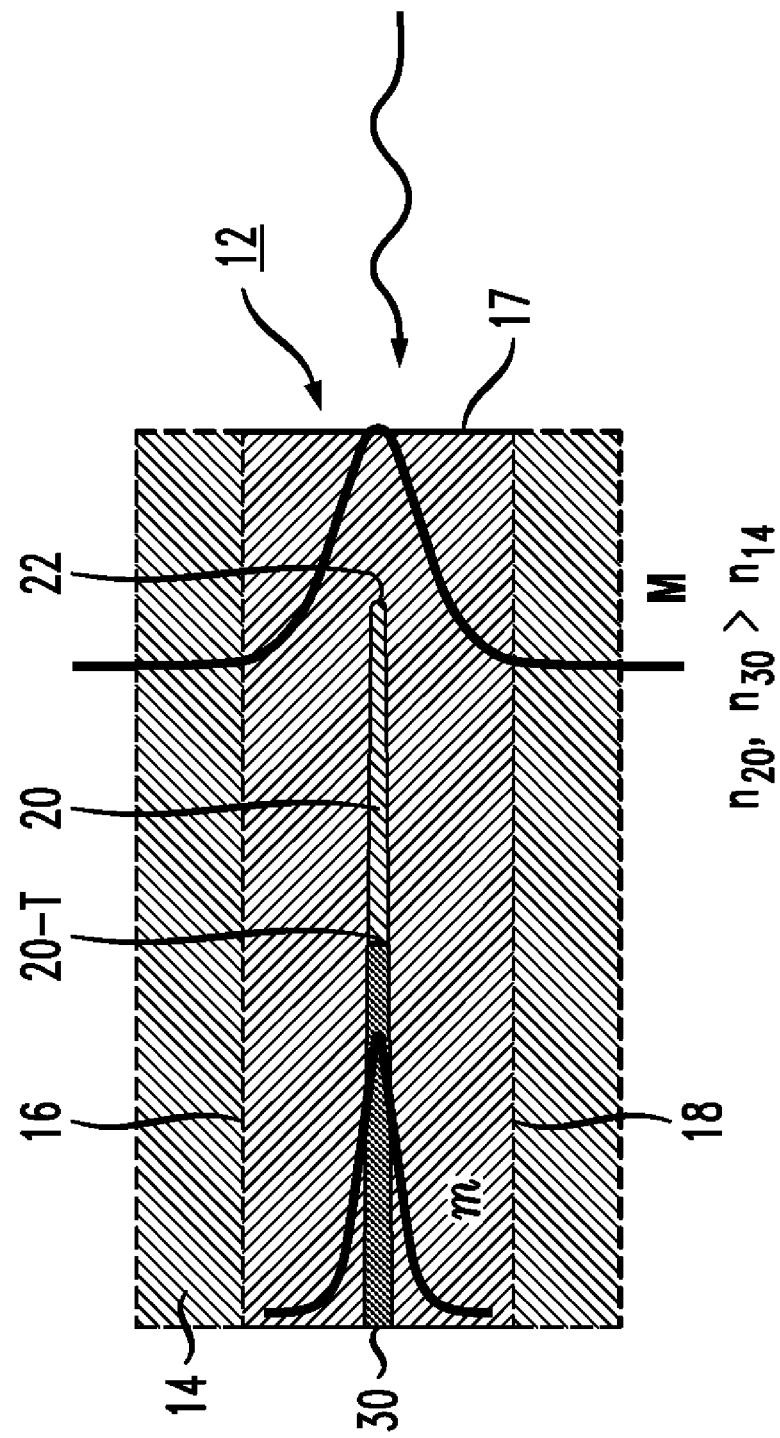
FIG. 6 is a top view of an exemplary low index ARROW structure with an embedded nanotaper coupling waveguide, forming an optical coupler in accordance with the present invention.
Figure 7:
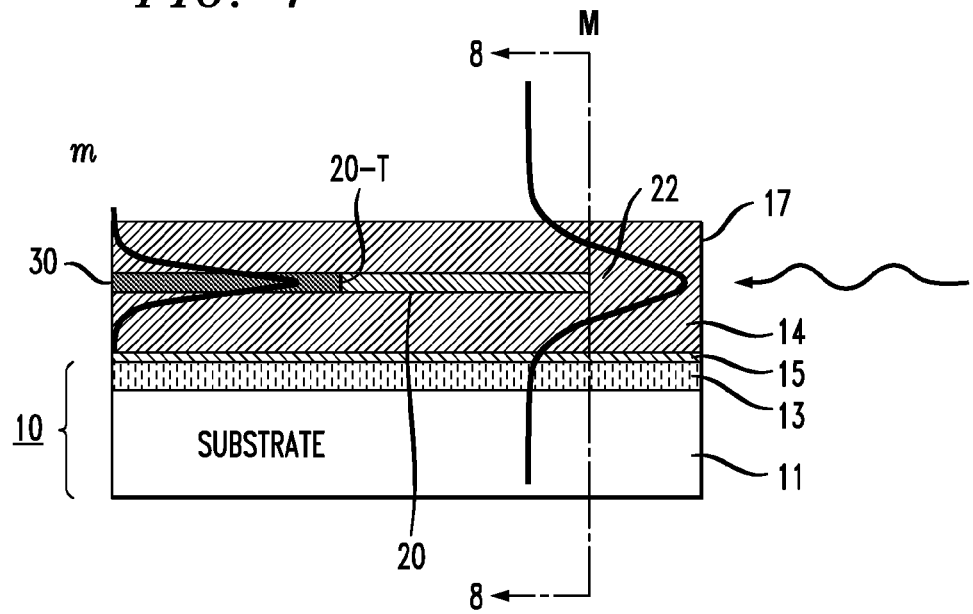
FIG. 7 is a side view of the arrangement of FIG. 6.
Figure 8:
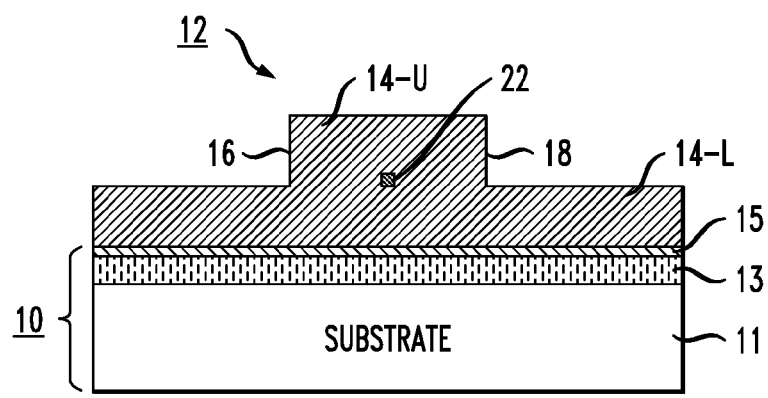
FIG. 8 is a cut-away end view of the present invention, taken along line 8-8 of FIG. 7.

With this description of a basic ARROW structure, a first embodiment of the present invention can be fully described and understood. In accordance with this first embodiment of the present invention, a low index optical coupler comprises an ARROW structure with an embedded nanotaper waveguide to provide efficient, low loss coupling of an optical signal into a single mode strip waveguide formed within a silicon-based optical substrate. FIG. 6 is a top view of an arrangement of this embodiment of the present invention, where a nanotaper coupling waveguide 20 is used in combination with ARROW structure 12 to introduce a propagating optical signal into a single mode strip waveguide 30 formed along the optical substrate. FIG. 7 is a side view of the ARROW-based coupler of FIG. 6 and FIG. 8 is a cut-away end view, taken along line 8-8 of FIG. 7. The positioning of the embedded nanotaper waveguide within the ARROW structure is evident in the views of FIGS. 7 and 8.

In accordance with the present invention, ARROW structure 12 is formed of a relatively low index material (such as silicon dioxide) and nanotaper coupling waveguide 20 is formed of a relatively high index material (such as silicon or silicon nitride). It is to be understood that various materials may be used to form both the low index ARROW structure coupler and the high index nanotaper coupling waveguide, as long as the contrast between the two values is sufficient to provide the desired propagating and coupling functions; that is, $n_{20} > n_{14}$.

As shown in FIGS. 6 and 7, an incoming optical signal will couple into ARROW structure 12 where, as discussed above, layer 15 functions as the reflective surface that creates the resonant Fabry-Perot cavity of ARROW structure 12. While "layer 15" is shown as a single layer of material in the drawings, it is to be understood that in general, the reflective boundary for ARROW structure 12 may comprise a plurality of layers stacked upon one another (each exhibiting a slightly difference refractive index). This aspect of the present invention will be discussed in more detail below in association with FIGS. 22-23.

Referring back to FIG. 7, the optical signal which is coupled into and propagating along ARROW structure 12 will eventually impinge tip 22 of nanotaper coupling waveguide 20 and begin to experience a reduction in its mode field diameter. The presence of nanotaper coupling waveguide 20 will perform a mode transformation of the propagating optical signal from the relatively large mode field diameter M first supported by ARROW structure 12 to the narrower, smaller mode field diameter (shown as "m" in FIGS. 6 and 7) supported by a single mode strip waveguide conventionally used in silicon-based optical structures. A single mode strip waveguide 30 is shown in FIGS. 6 and 7 as seamlessly coupled to a terminal portion 20-T of nanotaper coupling waveguide 20.

Thus, in accordance with this embodiment of the present invention, the combination of the low index ARROW structure with the embedded, high index nanotaper coupling waveguide is capable of efficiently coupling a large mode field diameter optical signal into a relatively small mode field diameter (high index) optical waveguide. It is to be understood that the reciprocal nature of this arrangement also allows for a small mode field diameter signal propagating in the reverse direction along single mode strip waveguide 30 to expand as it passes through nanotaper coupling waveguide 20. The reverse-direction signal will then continue to expand in mode field diameter as it propagates through ARROW structure 12, creating a free space optical output signal of a relatively large mode field diameter.

Figure 25:
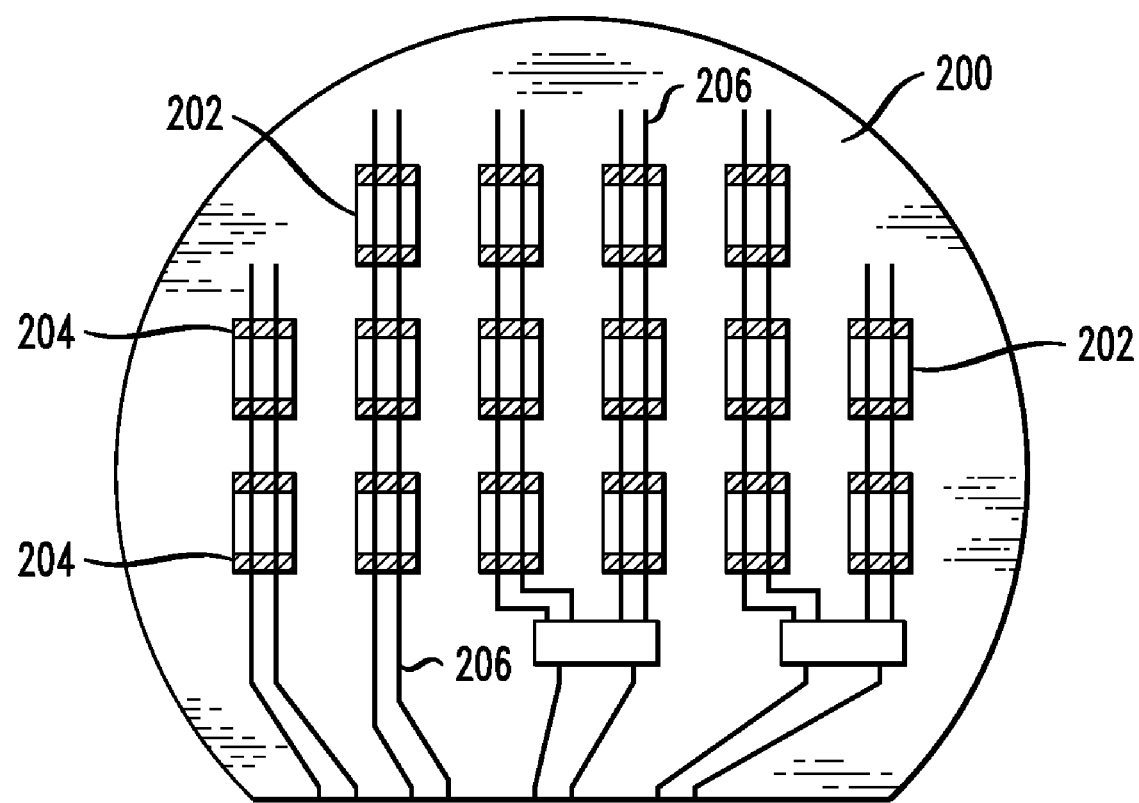
FIG. 25 illustrates an exemplary wafer arrangement of a plurality of opto-electronic devices, each device formed to include a low index, high mode field diameter coupler of the present invention.

The use of ARROW structure 12, therefore, allows for an incoming optical signal (from a source such as a laser, LED, vertical cavity surface emitting laser—VCSEL, fiber or other optical waveguiding structure formed on or in conjunction with an optical system) to be coupled into a single mode waveguide with lower loss and substantially relaxed alignment tolerances when compared to prior art coupling arrangements. Indeed, it is an advantage of the present invention that the low index large mode field diameter waveguide couplers can be formed at various locations across a wafer surface (as shown in FIG. 25) and used to couple/route optical signals across a wafer (or portion thereof).

This ability to form optical couplers at various locations across a wafer is particularly useful in testing and other manufacturing operations. Indeed, the ability to use CMOS processing and lithography techniques allows for reproducible optical coupling structures to be formed at various points across the wafer surface. The use of CMOS processing to form the coupler is considered to be a significant advantage over prior art coupling arrangements that require discrete optical components (such as lenses) to be individually placed and aligned in the structures and, as a result, these prior art coupling arrangements cannot be readily fabricated and tested at a wafer level.

In an alternative embodiment of the present invention, a low index optical waveguide can be used in conjunction with an underlying, high index nanotaper coupling waveguide to provide improved coupling between a free space optical signal and a single mode optical waveguide. Advantageously, the low index waveguide is formed on the same substrate as the nanotaper coupling waveguide/single mode waveguide combination, and is fully compatible with CMOS processing techniques. The low index waveguide is formed to include a tapered end section in the region which overlaps the nanotaper coupling waveguide. Preferably, the tapering is adiabatic to allow for complete power and signal transfer into the high index nanotaper coupling waveguide.

Figure 10:
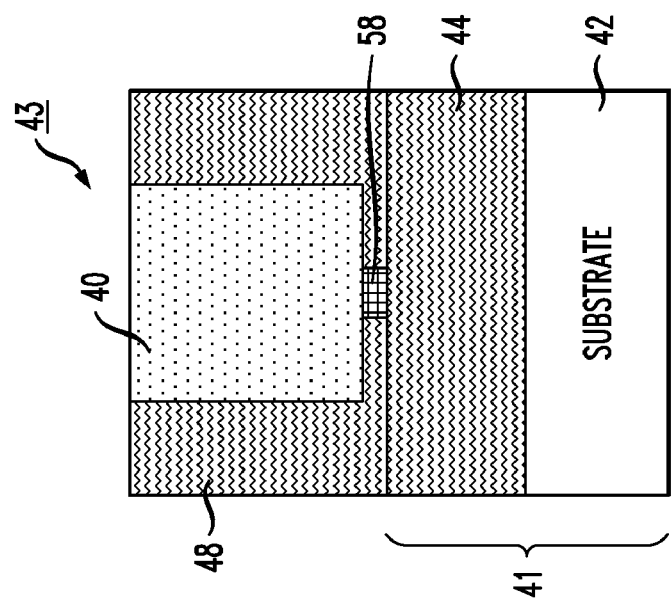
FIG. 10 is a cut-away end view of the embodiment of FIG. 9, taken along line 10-10.
Figure 11:
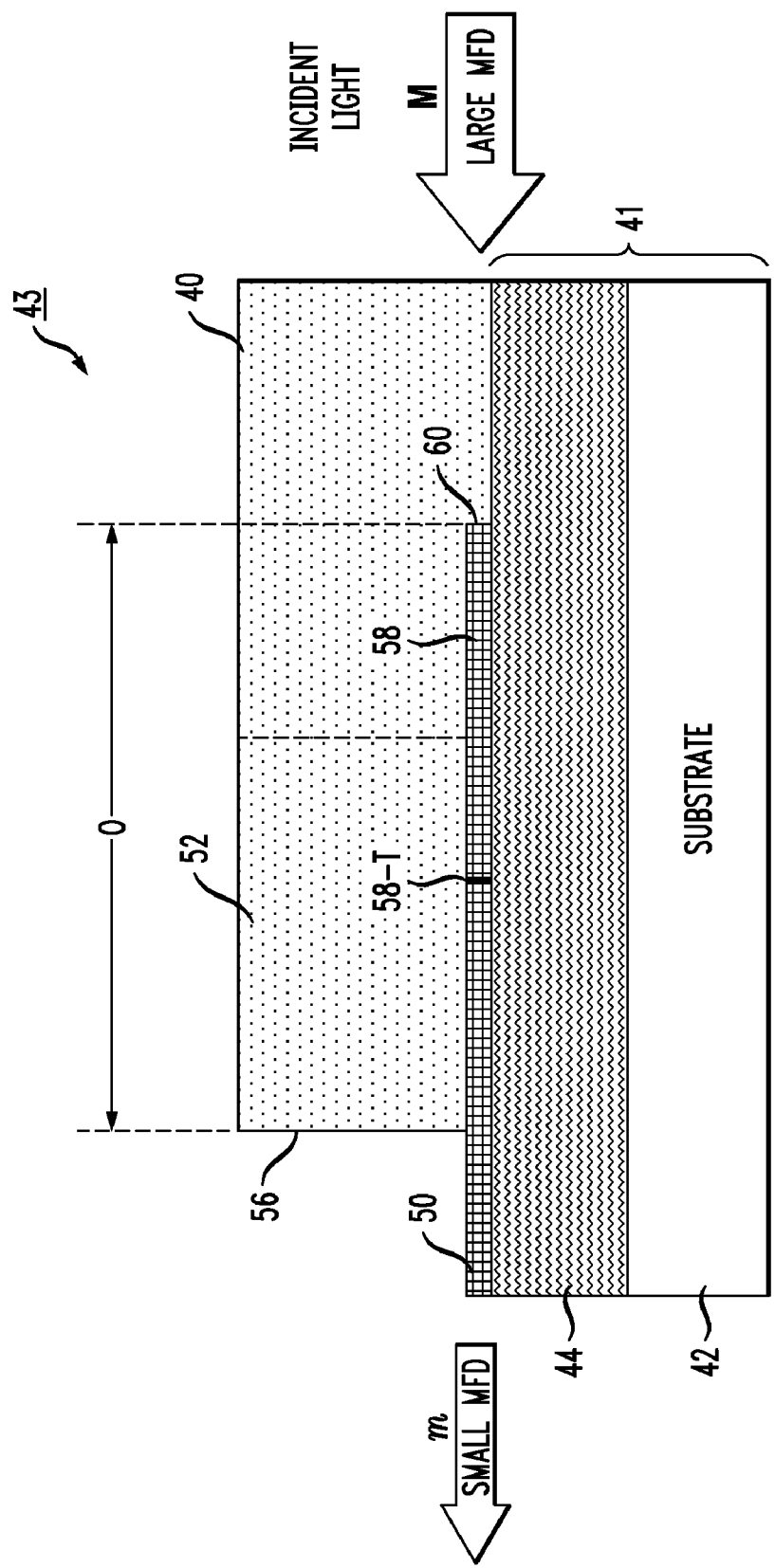
FIG. 11 is a side view of the embodiment of FIG. 9, taken along line 11-11.

FIG. 9 is a top view of an exemplary configuration of this alternative embodiment of the present invention, where FIG. 10 is a cut-away end view taken along line 10-10 of FIG. 9 and FIG. 11 is a side view taken along line 11-11 of FIG. 9. In this particular configuration, the structure comprises a low index rib optical waveguide 43 disposed over a silicon optical structure 41. Optical waveguide 43 comprises, in this embodiment, a core region 40 of a first material surrounded by an area of lower index material 48. Core region 40 may comprise one or more individual layers of material, not necessarily of the same material. Silicon optical structure 41 is best shown in FIGS. 10 and 11 and comprises a silicon substrate 42 and a buried oxide layer 44, with the high index nanotaper coupling waveguide 58 formed over the surface of oxide layer 44. The surrounding area 48 of lower index material (for example, silicon dioxide) is formed around low index core region 40 and nanotaper coupling waveguide 58 in the manner shown in FIG. 10.

Referring back to FIG. 9, an incoming optical signal having a large mode field diameter (MFD) will couple into low index waveguide 43 and thereafter be coupled into underlying high index nanotaper coupling waveguide 58. The propagating optical signal then transitions into a high index single mode strip waveguide 50 disposed at the termination 58-T of nanotaper coupling waveguide 58. In accordance with the present invention, core region 40 of waveguide structure 43 includes a tapered section 52 which is used to effectuate the transfer of the propagating optical signal into nanotaper coupling waveguide 58 and thereafter single mode strip waveguide 50, at some finite distance from input coupling facet 47. Tapered section 52 is shown as including a tip termination 56.

As will be discussed below in association with FIGS. 12 and 13, the length of the overlap between nanotaper coupling waveguide 58 and tapered section 52 of low index core region 40 of waveguide 53 is one factor that may be adjusted to provide the desired degree of coupling therebetween.

Low index waveguide core region 40 may comprise a material such as, for example, silicon oxynitride (SiON), which may have an index ranging from 1.5 to 2.0. A typical value would be about 1.55-1.60, which is slightly greater than the index of 1.5 for the surrounding silicon dioxide layer 48. Moreover, low index waveguide core region 40 may comprise a graded refractive index profile where, for example, the ratio of nitrogen to oxygen in the deposited SiON material is controlled such that the refractive index exhibits its largest value at the interface with underlying nanotaper coupling waveguide 58 and thereafter decreases in the vertical direction. Well-known CMOS processing steps may be used to provide this graded index. The use of such a graded index structure allows for the resultant coupling between low index waveguide structure 43 and high index nanotaper coupling waveguide 58 to be even more efficient (for example, allowing for the power transfer to be completed over a shorter section of nanotaper coupling waveguide 58). Nanotaper coupling waveguide 58 and single mode strip waveguide 50 are both formed of a relatively high index material (when compared to the low index values of waveguide core region 40 and dielectric layer 48) and may comprise a material such as silicon or silicon nitride, having an index in the range of 2-4. Preferably, both are formed of the same material to eliminate coupling inefficiencies and reduce reflections at termination 58-T.

The cross-sectional area of low index waveguide structure 43, as best shown in FIG. 10, is selected to be compatible with the structure of high index waveguide 50 and also to create a single mode structure. Again, the use of a graded index waveguide core region 40 will be one factor in determining the geometry of the region. The length O of the overlap between the taper and transition regions (see FIGS. 11-13) is selected to provide adiabatic and complete power transfer between low index waveguide 43 and high index waveguide 50. In particular, the overlap of low index waveguide tapered section 52 and high index nanotaper coupling waveguide 58 may be optimized to achieve adiabatic transfer of optical power from waveguide 43 to waveguide 50, thus preserving the mode of the propagating signal (a particularly important aspect for single mode operation). The arrangement as shown in FIG. 12 includes a relatively long overlap region (denoted $O_{long}$) and FIG. 13 includes a relatively short overlap region (denoted $O_{short}$). The variation in overlap length is one factor to consider, in association with refractive index values, waveguides geometries, etc., in providing efficient adiabatic power transfer.

Figure 14:
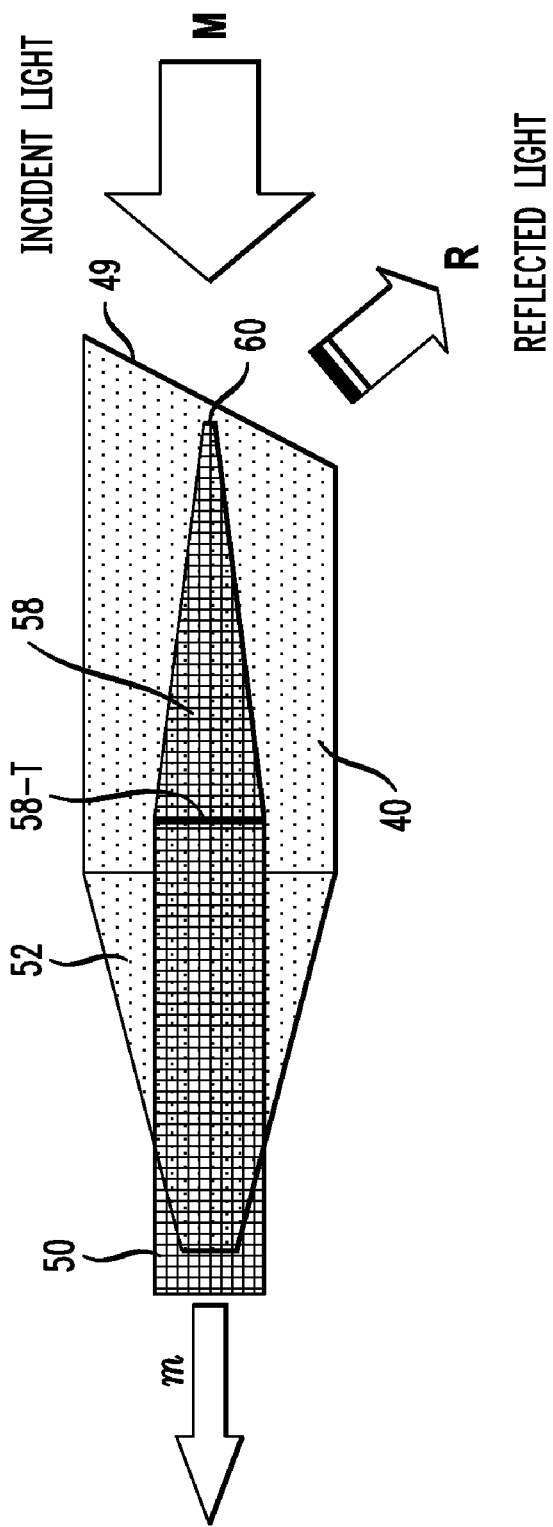
FIG. 14 is a top view of a different configuration of the embodiment of FIG. 9, including an angled endface of the low index waveguide to prevent reflections from re-entering the optical signal path.
Figure 17:
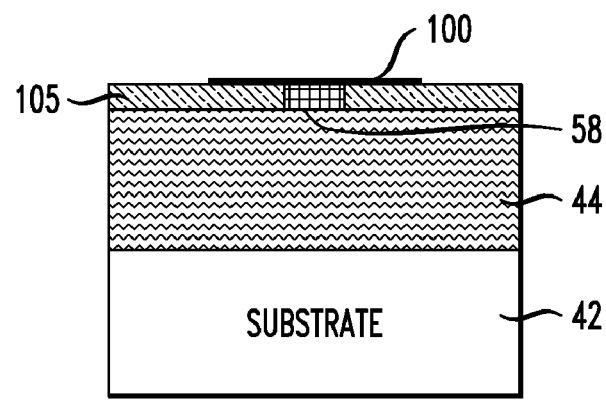
FIGS. 17-22 illustrate an exemplary fabrication process for forming an inverted rib waveguide structure and underlying nanotaper coupling waveguide in accordance with one embodiment of the present invention.

FIG. 14 is a top view of another configuration of the embodiment of FIGS. 9-13. Comparing with the top view of FIG. 9, it is clear that the configuration of FIG. 14 includes an angled endface 49 along low index waveguide 43. It has been found that by angling this endface, most of the power in a reflected signal R will be directed away from the optical axis. When using the coupler of the present invention in conjunction with a laser source, for example, the ability to minimize reflections is critical to the operation of the laser.

Figure 15:
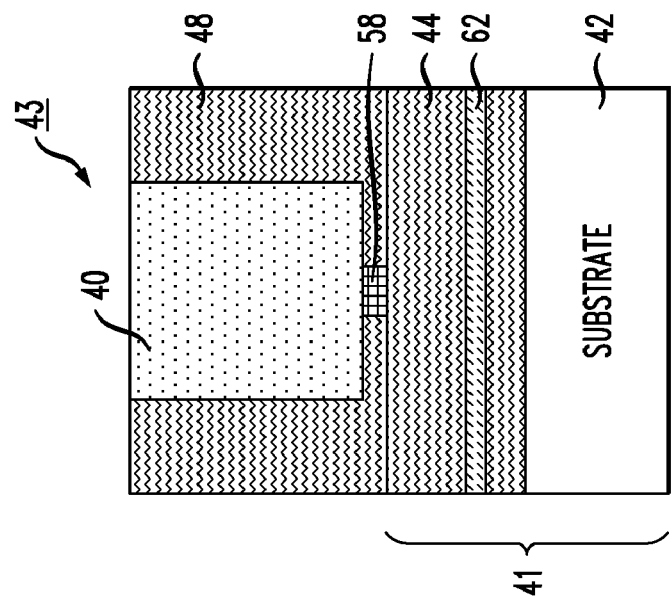
FIG. 15 is an end view of yet another embodiment of the present invention, forming an ARROW structure within the embodiment of FIG. 9.

FIG. 15 is an end view of yet another embodiment of the present invention, in this case incorporating a reflective surface within buried oxide layer 44 of the embodiment of FIGS. 9-13 to form an ARROW structure exhibiting this tapered geometry within the low index waveguide core region. In particular, the structure of FIG. 10 is modified to include a reflective boundary 62 as shown in FIG. 15, formed of silicon, amorphous silicon, polysilicon, or the like. Indeed, as mentioned above, reflective boundary 62 may comprise a multiplicity of layers having various refractive index (e.g., high/low/high/low) to maximize confinement of the propagating optical signal. As shown, reflective boundary 62 is above silicon substrate 42 and thus defines a boundary of the Fabry-Perot cavity of the created structure. FIG. 16 is a side view of this embodiment, showing the evolution of a large mode field optical signal M as coupled into the endface of the structure into the small mode field signal m at tip 60 of nanotaper waveguide 58. Like the other embodiments, the arrangement of FIGS. 15 and 16 is reciprocal in nature, allowing for propagating signal along strip waveguide 50 to thereafter be launched as a large mode field diameter free space optical signal.

Figure 18:
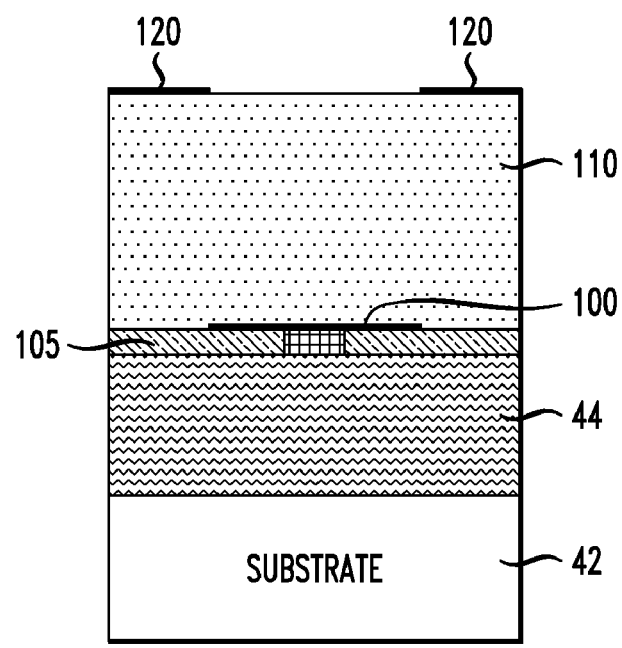
Figure 19:
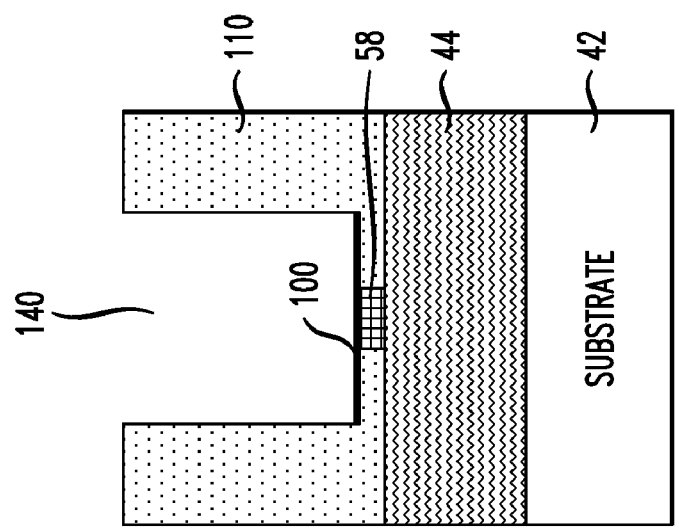
Figure 20:
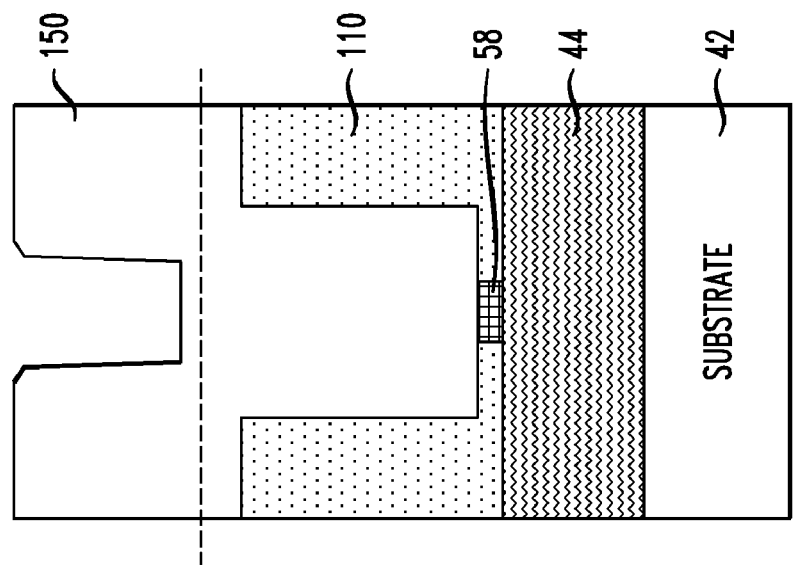
Figure 21:
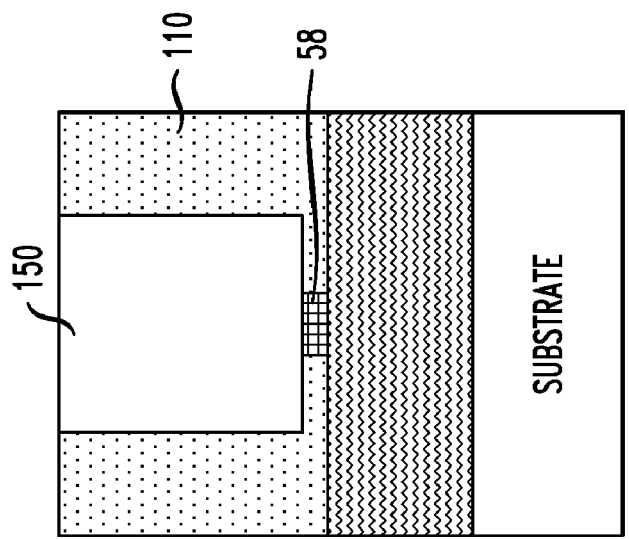
Figure 22:
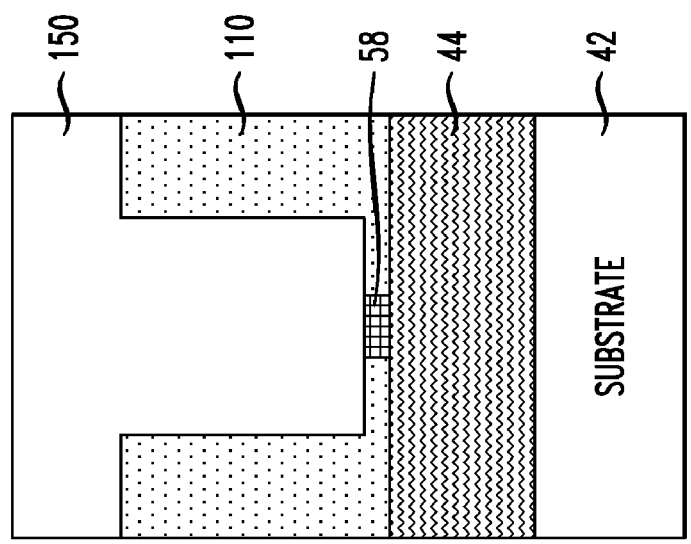

FIGS. 17-21 show, in general form, an exemplary sequence of processing steps that may be used to form the embodiment of the present invention as described above in association with FIGS. 9-14. Starting with the arrangement of FIG. 17, an etch stop layer 100 is first formed over nanotaper coupling waveguide 58 and an initial dielectric layer 105 (dielectric layer 105 having a thickness which creates a planar surface with waveguide 58). Thereafter, as shown in FIG. 18, a relatively thick dielectric layer 110 is deposited over dielectric layer 105 and nanotaper coupling waveguide 58. Advantageously, dielectric layer 110 may be used as the interlevel dielectric (ILD) layer of the associated opto-electronic arrangement (not shown). Dielectric layer 110 is then patterned at areas 120 to identify the width of the to-be-formed low index waveguide structure core region 40. Thereafter, the exposed region 130 of dielectric layer 110 is removed by etching, the process automatically ending at the location of etch stop layer 100, forming cavity 140 as shown in FIG. 19. Etch stop layer 100 is then removed, and a low index material 150 (such as, for example SiON) is deposited into cavity 140 as shown in FIG. 20 to form low index waveguide core region 40. The structure is then planarized (using a process such as chemical mechanical planarization—CMP), forming the configuration as shown in FIG. 21. Indeed, the planarization may continue until dielectric 110 is exposed, as shown in FIG. 22.

Figure 23:
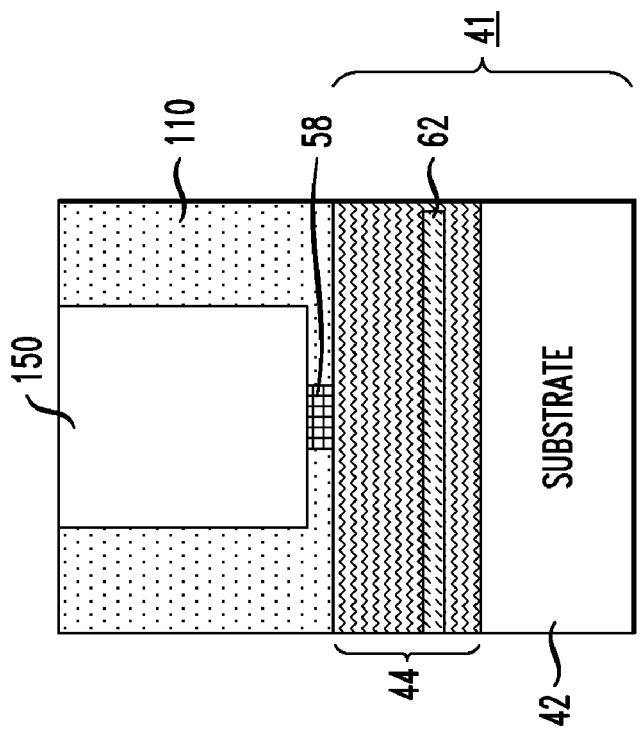
FIGS. 23 and 24 illustrate alternative steps to be employed in the fabrication process of FIGS. 17-22, in this case forming an ARROW structure.
Figure 24:
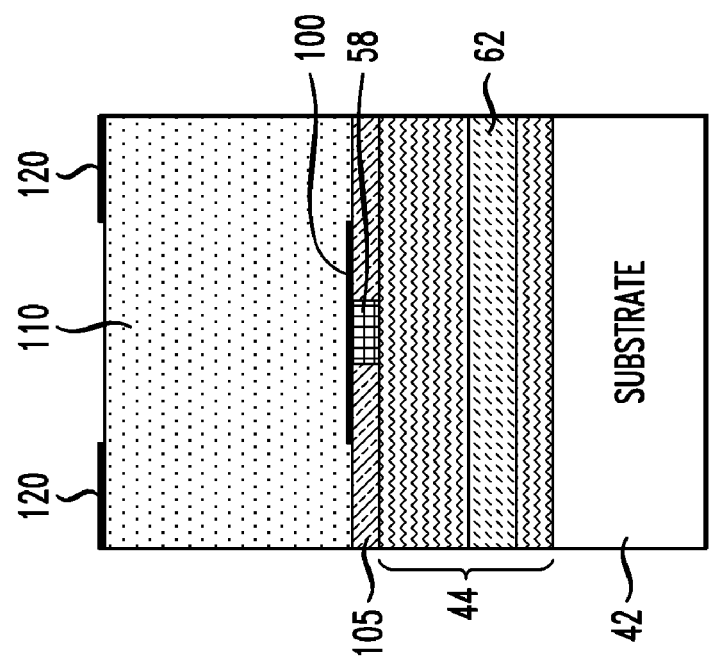

A similar process may be used to form the ARROW structure as shown in FIGS. 15 and 16. In this case, the initial arrangement (as shown in FIG. 23) is a modified version of FIG. 17, where one or more layers of high index material have been deposited to form boundary 62 (for example, polysilicon, amorphous silicon, silicon nitride, or the like). The process then continues in the manner described above in association with FIGS. 18-22, resulting in the arrangement as shown in FIG. 24.

As mentioned above, core region 40 may be formed to exhibit a graded refractive index value (the value decreasing as the material is being deposited). Well-known CMOS processing techniques may be used to control the refractive index value by controlling the relative ratios of the various constituents (e.g., silicon, oxygen, nitrogen) during the deposition process.

Lastly, it is to be understood that the coupling structure of the present invention is inherently reciprocal in operation. That is, an optical signal propagating along high index waveguide 50 may be coupled into low index waveguide 40 and thereafter coupled into a receiving optical component, such as an optical fiber, photodiode, or the like. Indeed, the ability to utilize the larger, low index waveguide to provide efficient power transfer/coupling to a free space optical device (whether a transmitting device or receiving device) is considered to be a significant advantage of the present invention. Significantly, the low index waveguide coupling structure of the present invention is useful in a variety of applications, including providing wafer-scale optical signal routing.

FIG. 25 shows an exemplary wafer level configuration, where wafer 200 includes a plurality of separate opto-electronic components 202. Various ones of components 200 are formed to include a low index waveguide coupler structure 204 of one of the embodiments described above. A plurality of optical signal waveguides 206 are disposed along wafer 200 and used to provide optical signals from/to coupler structures 204. For example, an off-chip arrangement (not shown) may be used to provide a set of optical test signals along waveguides 206 and into components 202.

While the present invention has been described with reference to several embodiments thereof, those skilled in the art will recognize various changes that may be made without departing from the spirit and scope of the claimed invention. Accordingly, the invention is not limited to what is shown in the drawings and described in the specification, but only as indicated in the claims appended hereto.

What is claimed is:

1. A silicon-based optical coupler for providing optical coupling between a free space optical signal exhibiting a large mode field diameter and a single mode optical waveguide formed on an optical substrate and exhibiting a mode field diameter smaller than the optical signal, the silicon-based optical coupler comprising:
    an antiresonant reflecting optical waveguide (ARROW) structure disposed at an endface of the optical substrate and comprising a low index core region and a high index reflective boundary layer having a refractive index higher than the low index core region, the arrow structure exhibiting a large mode field diameter to provide coupling for the free space optical signal, the high index reflective boundary layer disposed under the low index core region forming in combination a resonant cavity; and
    a nanotaper coupling waveguide including a core region having a greater refractive index than the low index core region of the ARROW structure, the nanotaper coupling waveguide disposed between the ARROW structure and the single mode optical waveguide for providing coupling therebetween, the nanotaper coupling waveguide includes a narrow tip termination, tapering outwardly therefrom to an endface, the single mode waveguide coupled to the endface of the core region of the nanotaper coupling waveguide, wherein the nanotaper coupling waveguide performs mode field diameter conversion between the large mode field diameter ARROW structure and the small mode field diameter single mode optical waveguide.

2. A silicon-based optical coupler as defined in claim 1 wherein the ARROW structure low index waveguide core region comprises a dielectric material.

3. A silicon-based optical coupler as defined in claim 2 wherein the dielectric material is further utilized as at least one interlevel dielectric layer.

4. A silicon-based optical coupler as defined in claim 2 wherein the reflective boundary layer comprises at least one layer of material selected from the group consisting of: amorphous silicon, polysilicon, single crystal silicon and silicon nitride.

5. A silicon-based optical coupler as defined in claim 1 wherein the nanotaper coupling waveguide comprises silicon.

6. A silicon-based optical coupler as defined in claim 2 wherein the nanotaper coupling waveguide comprises silicon nitride.

7. A silicon-based optical coupler as defined in claim 1 wherein the ARROW structure comprises a tapered end disposed in an overlapping arrangement with the narrow tip termination of the nanotaper coupling waveguide.

8. A silicon-based optical coupler as defined in claim 7 wherein the ARROW structure further comprises an angled endface along the surface opposite of the tapered end section.

9. A silicon-based optical coupler as defined in claim 7 wherein the ARROW structure comprises silicon oxynitride.

10. A silicon-based optical coupler as defined in claim 7 wherein the coupler further comprises a dielectric confinement region surrounding the ARROW structure, the dielectric confinement region having a refractive index less than that of silicon oxynitride.

11. A silicon-based optical coupler as defined in claim 7 wherein the ARROW structure exhibits a graded refractive index profile sufficient to create the tapered end section.

12. A silicon-based optical coupler as defined in claim 1 wherein the ARROW structure comprises a rib waveguide.

13. A silicon-based optical coupler as defined in claim 1 wherein the ARROW structure comprises an inverted rib waveguide.

14. A silicon-based optical coupler as defined in claim 1 wherein the ARROW structure comprises a strip waveguide.

15. A silicon-based optical coupler as defined in claim 1 wherein the ARROW structure comprises a buried strip waveguide.

* * * * *